Aug. 15, 1944.  E. WURGER  2,355,939
FILM GUIDING AND FEEDING DEVICE FOR
CINEMATOGRAPHIC APPARATUS
Filed Oct. 5, 1942  2 Sheets-Sheet 2
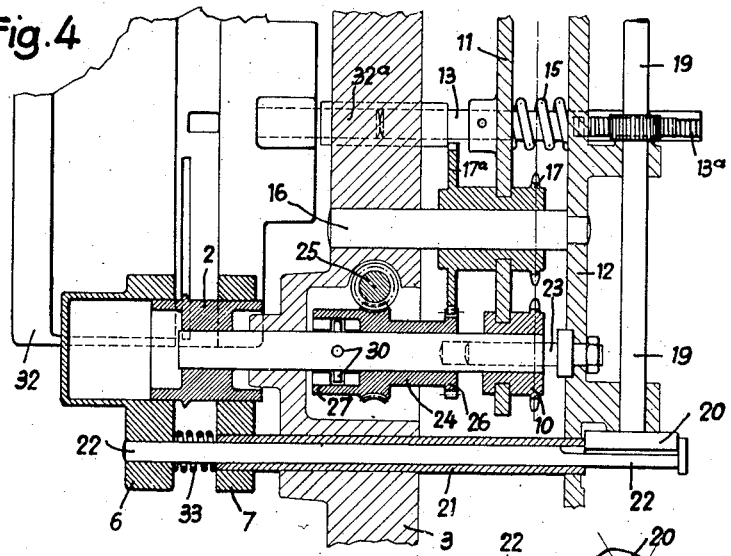
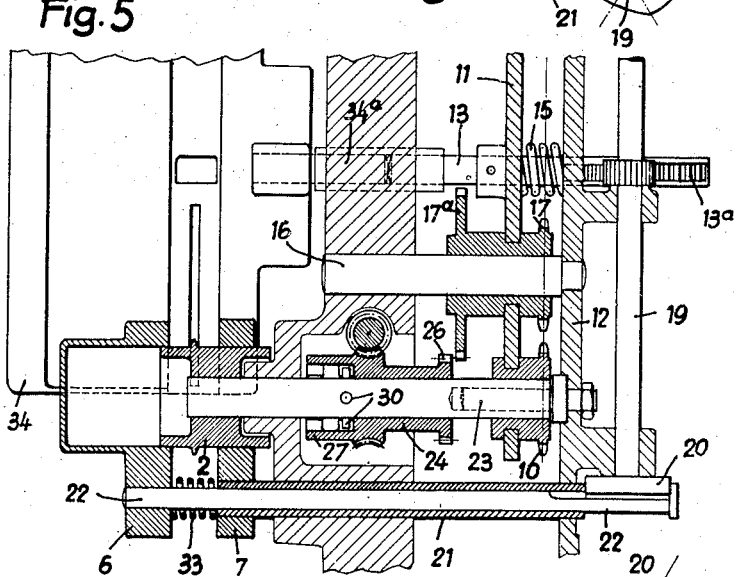

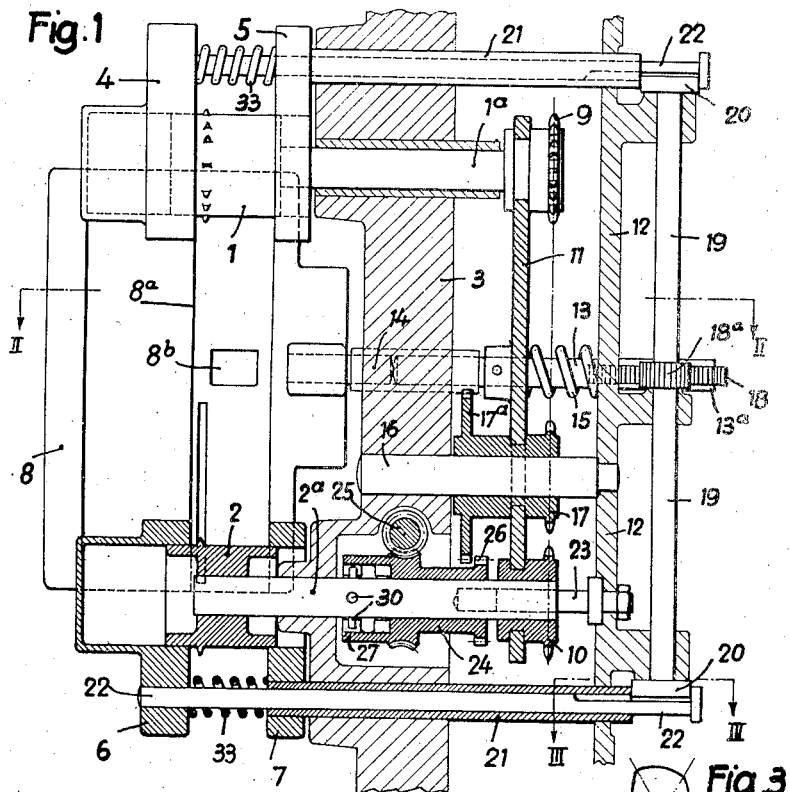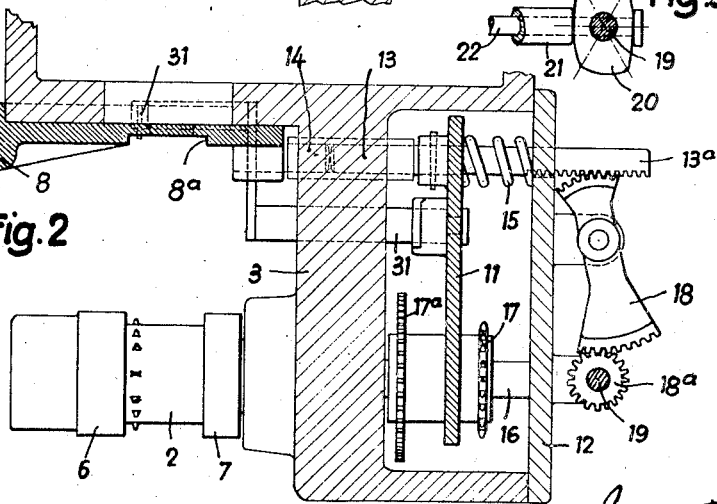

Patented Aug. 15, 1944

2,355,939

UNITED STATES PATENT OFFICE 2,355,939

FILM GUIDING AND FEEDING DEVICE FOR CINEMATOGRAPHIC APPARATUS

Emile Wurger, Le Locle, Switzerland

Application October 5, 1942, Serial No. 460,872
In Germany October 22, 1941

7 Claims. (Cl. 88—18.4)

Many forms of cinematographic apparatus lending themselves to the use of sensitized films having different widths are already known. Amongst such apparatus may be cited for example those of the type wherein for each film width special loosely mounted film-guiding members (guiding plate and reeling and winding drums) and film-feeding members (grippers or dogs) may be set into operation, which obviously is a complicated task and calls for a certain amount of professional skill. Cinematographic cameras are also known wherein the said film guiding and feeding members are adjustable in a plurality of ways on the camera itself so as to build up several sets of members corresponding to the various film widths. In this type of camera, the set of film guiding and feeding members matching a given film width is trued up by adjusting said members. This can be achieved in a more convenient way than if such members were loosely mounted as is the case in the aforesaid first type of camera but has the concomitant disadvantage of rendering the structure of the camera more intricate and of giving rise to operational disturbances.

An object of the invention is to permit the fabrication of a cinematographic apparatus which due to its simplicity eliminates all the foregoing disadvantages by the provision of a new or improved film guiding and feeding device adaptable to cameras of this kind and comprising a set of interchangeable film-guiding and setting plates for films having different widths but presenting no appreciable discrepancy so far as perforation pitch and image spacing are concerned or at least such discrepancies as are in a whole number ratio.

Another object of the invention is to provide a new film guiding and feeding device as aforesaid having such an improved structure that the mere insertion of any one of a set of interchangeable film-guiding and setting plates respectively corresponding to the widths and operative conditions connoted by films of different widths but of uniform perforation and image pitch constrains all the members partaking of the film guiding and feeding action in the camera to assume proper operative conditions matching with the width of the film being fed through the camera at the moment considered.

Yet another object of the invention is to provide a new film guiding and feeding device as aforesaid involving a change speed gear operative on the film-winding member and a coupling on the shaft carrying said member so that when the feeding speed is changed over from one particular ratio to another as called for by another film width the coupling intervenes for transiently disengaging said shaft from the drive.

A further object of the invention is to provide a new film guiding and feeding device as aforesaid made up of a minimum number of simple and rugged parts such as will ensure proper and reliable operation while simplifying change over manipulations from one film width to another.

With these and such other objects in view as will incidentally appear hereafter, the invention comprises the novel construction, combination and arrangement of parts that will now be described with reference to the accompanying sheets of drawings exemplifying a suitable constructional embodiment of the same and forming a part of the present disclosure.

In the drawings—

Figure 1 is a vertical sectional view of this film guiding and feeding device.

Figure 2 is a cross sectional view of the same on the line II—II of Figure 1.

Figure 3 is a detail view showing a control or cam part occupying a certain position.

Figures 4 and 5 are sectional views corresponding to Figure 1 but taken assuming the device to occupy other positions.

Figures 6 and 7 are detail views siimlar to Figure 3 but showing the said control or cam part when the device occupies the said other positions.

1 is the reeling drum mounted on one end of a shaft 1$^a$; 2 is the winding drum mounted on one end of a shaft 2$^a$. The shafts 1$^a$, 2$^a$ are journalled in a side plate 3 of the camera frame structure. Each of the drums 1, 2 is fitted with a pair of adjustable side guiding flanges 4, 5, and 6, 7 and intermediate these drums and on the winding off path of the film is provided a film-guiding and setting plate 8 furnished with a film-showing window 8$^b$ in the film gate 8$^a$ and interchangeably mounted on the camera. The other end of the shaft 1$^a$ has mounted thereon a sprocket 9 operatively connected by a chain (merely shown by a dot and dash line) with a similar sprocket 10 mounted on the other end of the shaft 2$^a$. Each of these two sprockets is provided with a groved hub portion by which they are guided over a movable driver plate 11 secured to an operating rod 13 carried at one end by the frame side plate 3 and at the other end by an auxiliary carrying plate 12.

As the film guiding and setting plate 8 is engaged, the movable driver plate 11 is shifted towards the auxiliary carrying plate 12 by means of a control pin 14 on the plate 8 and thus pushes the sliding pin 13 against the action of a coil spring 15. Therefore the driver plate 11 shifts with it the aforesaid members connected thereto as well as an intermediate sprocket 17 loosely mounted on an auxiliary shaft 16. Said sprocket 17 is also grooved and guided by the plate 11 and it is operatively connected to the chain which passes over both sprockets 9, 10. The end portion of the sliding pin 13 adjacent the auxiliary end plate 12 is so toothed as to form a rack 13ª which meshes with one side of a double segmental pinion 18 (Figure 2) whose other side meshes with a spur wheel 18ª mounted upon an auxiliary shaft 19 revoluble in bearing brackets on the auxiliary carrying plate 12, said shaft 19 carrying at each of its ends a cam disk 20.

The purpose of the two cams disks 20 is to so adjust the side guiding flanges 4, 5 and 6, 7 as to cause their interval to match the width of the particular film being used through the medium of a hollow shaft 21 and a spindle 22 slidably received therein.

The shaft 2ª is guided at its end remote from the winding drum 2 owing to a bore and bolt 23 screwed to the auxiliary carrying plate 12. Upon the shaft 2ª is loosely mounted a driving nut 24 whose periphery has worm teeth meshing with a driving worm 25. The end of the shaft 2ª adjacent to the sprocket 10 is provided with a circular row of spur teeth 26 with which can be brought into mesh a spur wheel 17ª forming a unitary assembly with the intermediate sprocket 17. The end portion of the driving nut 24 adjacent the winding drum 2 is so shaped as to form a coupling sleeve 27 internally provided with two separate sets of coupling cams cooperating with a driving spider 30 having several arms and fixed to the shaft 2ª.

In Figure 1 is shown the position of the parts for operating the camera with a 16 millimeter wide film. The drive is derived from the worm 25 and transmitted through the driving nut 24, shaft 2ª and sprockets 9, 10. Therefore both drums 1, 2 are set into rotation, while the feeding gripper or dog 31 shown in Figure 2 only is brought into action to feed the film by means of a particular driving device the constructional details of which form no part of the invention. This gripper driving device involves several leverages and permits the gripper to be adjusted to several operative strokes in accordance with the several kinds of films to be fed through the camera gate. This is effected in an obvious manner by shifting the gripper pin 31 secured to the plate 11.

In Figure 4 is shown the position of the parts for operating the camera with an 8 millimeter wide film. In order to adjust the camera, it suffices to insert a corresponding guiding and setting plate 32 which, however, includes a pin 32ª somewhat longer than the pin 14 on the 16 millimeter gage film-guiding plate 8. Both cam disks 20 fitted on the transverse shaft 19 are therefore rotated from the position shown in Figure 3 to the position in Figure 6, whereby the side guiding flanges 4, 5 and 6, 7 are so brought together against the action of springs 33 coiled therebetween on the spindle 22 as to be separated by 8 millimeters only. The driver plate 11 is simultaneously shifted to the right as well as the members connected thereto, i. e., the sprockets 9, 10, shafts 1ª, 2ª and the drums 1, 2 the intermediate sprocket 17 mounted on the auxiliary shaft 16 and lastly the feeding gripper 31 (Figure 2) which is also rigidly connected to the driver plate 11. The driving nut 24 remains where it was to be subsequently driven by the worm 25. However, owing to the displacement of the shaft 2ª with respect to the coupling sleeve 27, the driving spider 30 is in idle position while both spur wheels 26, 17ª reach their meshing position so that the drive no longer takes place with the speed ratio suitable for 8 millimeter wide film operation but through the intermediate sprocket 17. The operative motion of the gripper or dog 31 also matches this change of the speed ratio from the 8 millimeter film width over to the 16 millimeter film width.

Should the camera finally have to be adjusted for receiving a 9.5 millimeter wide film, a corresponding film-guiding and setting plate 34 including a still longer control pin 34ª is again inserted so as to permit the parts to be brought to the position shown in Figures 5 and 7. As the feeding rate is the same for a 9.5 millimeter wide film as for a 16 millimeter wide film, the driving motion may be imparted to the drums 1, 2 with the same ratio as in the case of a 16 millimeter wide film through the sprocket 10. To that effect, the driving spider 30 is again brought into engagement with the coupling sleeve 27 of the driving nut 24.

It will be seen from the foregoing explanations that mere insertion of different film-guiding and setting plates corresponding to film widths of 16, 9.5 and 8 millimeters respectively enables the members partaking of the guiding and feeding actions on the film to be automatically brought to the positions required for operation with these different film gages.

Minor constructional details may be changed without departing from the scope of the subjoined claims.

The term "cinematographic apparatus" as used herein may include cinematographic projectors as well as cinematographic cameras.

What I claim is:

1. In a cinematographic apparatus, a device for selectively guiding and feeding sensitized films having different widths but perforation pitches and image spacings mutually equal or differing by a whole number ratio, said device comprising in conjunction with the reeler and the winder for the film and adjustable film guiding and feeding means, means for adjusting said last-named means, a set of interchangeable film-guiding and setting plates each provided with control means having a size suited to a film width and engageable with said means for adjusting said adjustable means, each of said plates being so insertable into the camera as to bring its control means into engagement with the said adjusting means and thereby to adjust said adjustable means so as to set the latter to an operative condition matching the film width to which the inserted plate corresponds.

2. In a cinematographic apparatus, a device for selectively guiding and feeding sensitized films having different widths but perforation pitches and image spacings mutually equal or differing by a whole number ratio, said device comprising in conjunction with a reeling drum and a winding drum for the film, said drums having adjustable film-guiding flanges, and with a movable driver element operatively connected to said flanges and carrying means for revolving said drums and feeding the film, a set of interchangeable film-guiding and setting plates each provided with a control pin having a length suited to a particular film width and engageable with said driver element, each of said plates being so insertable selectively into the camera as to bring its control pin into engagement with the driver element to set said flanges and said means to an operative condition matching said particular film width.

3. In a cinematographic apparatus, a device for selectively guiding and feeding sensitized films having different widths but perforation pitches and image spacings mutually equal or differing by a whole number ratio, said device comprising in conjunction with a flanged reeling drum and a flanged winding drum for the film, said flanges being adjustable, and with a movable driver plate operatively connected to said flanges and carrying power-operated sprockets fast on the drum shafts and a film-feeding dog, a set of interchangeable film-guiding and setting plates each provided with a control pin having a length suited to a particular film width and engageable with said driver plate, each setting plate being so insertable selectively into the camera as to bring its control pin into engagement with the driver plate to adjust the flange interval to a value and bring said sprockets to an operative condition matching said particular film width.

4. In a cinematographic apparatus, a device for selectively guiding and feeding sensitized films different widths but perforation pitches and image spacings mutually equal or differing by a whole number ratio, said device comprising a flanged reeling drum and a flanged winding drum for the film, said flanges being movable and connected to a common adjuster, a shiftable driver plate operatively connected to the adjuster and carrying power-operated sprockets fast on the drum shafts and a film-feeding dog, a change speed gear associated with the sprockets, and a set of interchangeable film-guiding and setting plates each provided with a control pin having a length suited to a particular film width and engageable with said driver plate, each setting plate being so insertable selectively into the camera as to bring its control pin into engagement with the driver plate to adjust the flange interval to a value and bring said sprockets and gear to power-transmitting conditions matching said particular film width.

5. In a cinematographic apparatus, a device for selectively guiding and feeding sensitized films having different widths but perforation pitches and image spacing mutually equal or differing by a whole number ratio, said device comprising a flanged reeling drum and a flanged winding drum for the film, said flanges being movable and conntected to cam disk adjusters mounted on a common shaft, a shiftable driver plate operatively connected to the adjuster and carrying power-operated sprockets fast on the drum shafts and a film-feeding dog, a change speed gear associated with the sprockets, and a set of interchangeable film-guiding and setting plates each provided with a control pin having a length suited to a particular film width and engageable with said driver plate, each setting plate being so insertable selectively into the camera as to bring its control pin into engagement with the driver plate to adjust the flange interval to a value and bring said sprockets and gear to power-transmitting conditions matching said particular film width.

6. In a cinematographic apparatus, a device for selectively guiding and feeding sensitized films having different widths but perforation pitches and image spacings mutually equal or differing by a whole number ratio, said device comprising a flanged reeling drum and a flanged winding drum for the film, said flanges being movable by shafts acted upon by cam disk adjusters mounted on a common shaft fitted with a spur wheel, a shiftable driver plate operatively connected by a spring-checked rod and a rack gear to said spur wheel and carrying power-operated sprockets fast on the drum shafts and a film-feeding dog, a change speed gear associated with the sprockets, and a set of interchangeable film-guiding and setting plates each provided with a control pin having a length suited to a particular film width and engageable with said driver plate, each setting plate being so insertable selectively into the camera as to bring its control pin into engagement with the driver plate to adjust the flange interval to a value and bring said sprockets and change speed gear to power-transmitting conditions matching said particular film width and projection requirements.

7. In a cinematographic apparatus, a device for selectively guiding and feeding sensitized films having different widths but perforation pitches and image spacings mutually equal or differing by a whole number ratio, said device comprising a flanged reeling drum and a flanged winding drum for the film, said flanges being movable by shafts acted upon by cam disks mounted on a common shaft fitted with a spur wheel, a shiftable driver plate operatively connected by a spring-checked rod and a rack gear to said spur wheel and carrying sprockets fast on the drum shafts and an intermediate sprocket having spur teeth, said plate also carrying a film-feeding dog, a change speed gear including a toothed sleeve engageable with said intermediate sprocket spur teeth and a worm gear operated from a power shaft, said sleeve being mounted on the winding drum shaft, a coupling also mounted on the last-named shaft, and a set of interchangeable film-guiding and setting plates each provided with a control pin having a length suited to a particular film width and engageable with said driver plate, each setting plate being so insertable selectively into the camera as to bring its control pin into engagement with the driver plate to adjust the cam disks and set the flange interval to a value and simultaneously bring said sprockets and change speed gear to power-transmitting conditions matching said particular film width and the projection requirements.

EMILE WURGER.